United States Patent [19]

Charlet et al.

[11] 4,247,518
[45] Jan. 27, 1981

[54] APPARATUS FOR THE THERMAL CONVERSION OF GYPSUM

[75] Inventors: Alain Charlet, Plaisir; Jean-Paul Coquery, Saint-Didier Au Mont d'Or; Francois Mounier, Maisons-Laffitte, all of France

[73] Assignee: Rhone-Poulenc Industries, Paris, France

[21] Appl. No.: 30,514

[22] Filed: Apr. 16, 1979

Related U.S. Application Data

[60] Continuation of Ser. No. 812,326, Jul. 1, 1977, abandoned, which is a division of Ser. No. 688,772, May 21, 1976, abandoned.

[30] Foreign Application Priority Data

May 23, 1975 [FR] France ............................. 75 16119

[51] Int. Cl.³ .................... B01J 8/18; F27B 15/00; C01F 11/46; C04B 11/02
[52] U.S. Cl. .................................... 422/142; 106/110; 165/104 F; 422/145; 422/146; 422/147; 423/171; 423/555; 432/58
[58] Field of Search .............. 422/142, 145, 146, 147; 423/170, 171, 172, 544, 555; 106/109, 110; 432/15, 16, 58; 34/57 A; 165/104 F

[56] References Cited

U.S. PATENT DOCUMENTS

| 2,498,405 | 2/1950 | Fader .............................. 422/200 X |
| 2,797,908 | 7/1957 | Zubrzycki ....................... 432/15 X |
| 3,265,775 | 8/1966 | Friedrich ......................... 432/16 X |
| 3,281,508 | 10/1966 | Goulounes ...................... 106/110 |
| 3,869,256 | 3/1975 | Ziegler ............................ 422/147 X |
| 4,000,563 | 1/1977 | Cubitt et al. .................... 34/57 A X |

*Primary Examiner*—Joseph Scovronek
*Attorney, Agent, or Firm*—Burns, Doane, Swecker & Mathis

[57] ABSTRACT

An apparatus for effecting the thermal conversion of gypsum to calcium sulfate hemihydrate includes a reactor having a series of fluidized bed compartments containing separate heat exchangers and defined by partitions each provided with an opening which is selected so that the material undergoing treatment progresses, without return movement, through the series of fluidized bed compartments. The apparatus is further constructed so as to permit recycling of fine gypsum particles from the outlet to the middle of the reactor.

5 Claims, 1 Drawing Figure

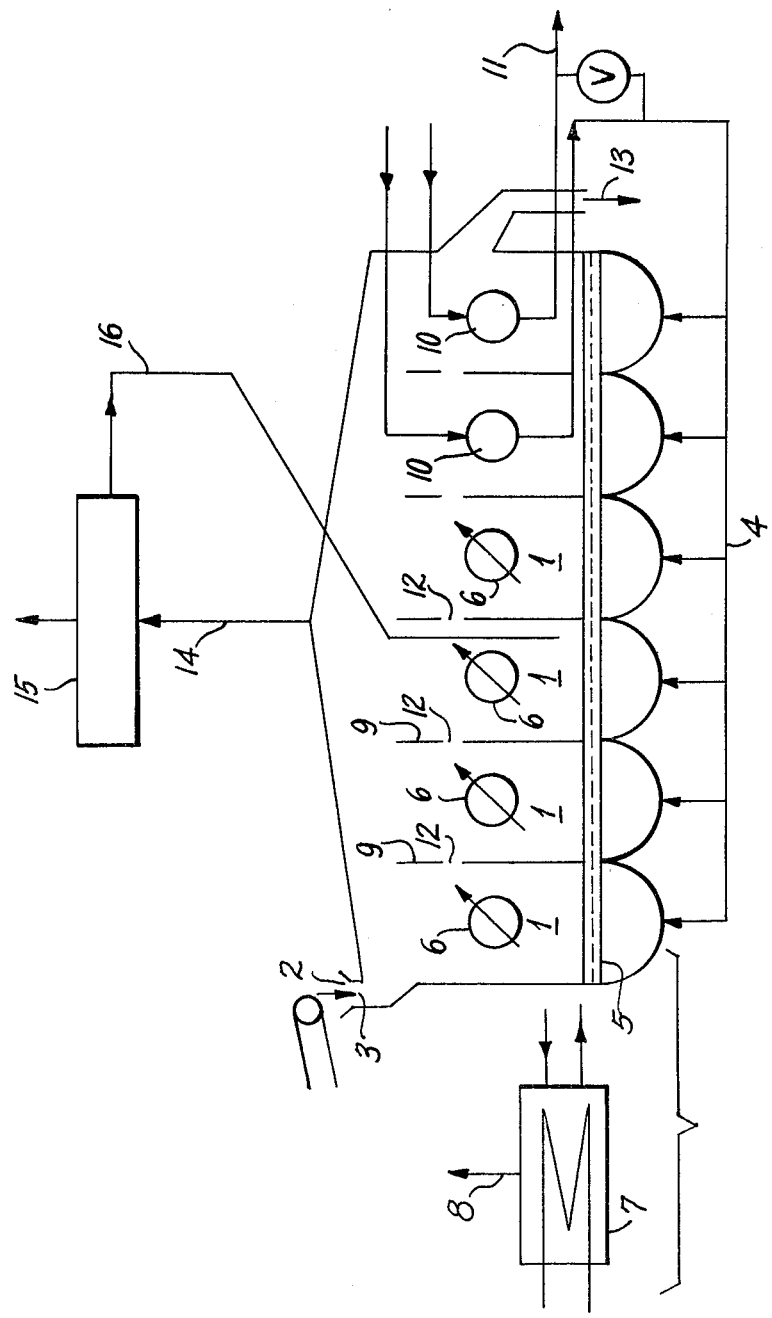

APPARATUS FOR THE THERMAL CONVERSION OF GYPSUM

This is a continuation of application Ser. No. 812,326, filed July 1, 1977; which in turn is a division of Ser. No. 688,772, filed May 21, 1976, both of which are now abandoned.

BACKGROUND OF THE INVENTION

1. Field of the Invention

This invention relates to a process and apparatus for the thermal treatment of gypsum ($CaSO_4.2H_2O$) by indirect heating to produce a hemihydrate product ($CaSO_4.0.5H_2O$).

2. Description of the Prior Art

Generally, it is known that in order to obtain a plaster which is rich in hemihydrate and is suitable for prefabrication, the method of calcination must first be carried out at a high temperature which imparts the required reactivity to the product; secondly, the gypsum must be homogeneous so as to avoid the presence of unburned material (non-dehydrated gypsum) and also of overburned material (or anhydrite II); sometimes caused by prolonged local contact with gases having a temperature and a partial pressure of water vapor which are incompatible with the stability of the hemihydrate form. Finally, the treatment must be economical and preferably continuous.

Many processes are known which are partially effective in achieving the desired results mentioned above. In the processes of German Applications Nos. P 17 71502 and P 17 58566 the reaction rate of the product undergoing reaction is achieved by mechanical movement of a part of the calcination apparatus, in rotating furnaces or in mobile hearth furnaces with direct or indirect heating. In all cases, the low coefficient of heat exchange requires large sizes of apparatus and hence high investment costs; likewise, it is also necessary to use dust elimination systems; in addition, the moving parts require maintenance which is not insignificant expense.

The reacting product is conveyed by means of a gas in the so-called "flash" calcination and pneumatic transport processes, as described in French Patent Application No. 2,202,251 and German Patent Applications Nos. P 22 00,532 and P 21 52,940. These processes are flexible but have the disadvantage of requiring large volumes of air, which, in the absence of complex recycling, prevents any possibility of controlling the partial pressure of water vapor of the system undergoing conversion. In contrast, the air/plaster ratio is much lower in the process of French Application No. 74/22,621 of the applicants, due to an apparatus of a special geometric design which makes it possible to operate at extremely high temperatures and to achieve a uniform conversion coupled with an excellent thermal efficiency.

Vertical transport of the material and calcination in a fluidized bed are also known, through French Patent No. 1,338,126 and its Addition No. 87,866, but until now a high, gypsum-fed fluidized bed required a high rate of fluidization, causing substantial dispersions and necessitating high-capacity blowers; moreover, such a device suffers from the drawbacks of using a single homogeneous reactor, in that the feeding of the reactant, at the outlet, reflects a compromise between the quality of the product and the size of the apparatus. Furthermore, the partial pressure of steam can only be controlled with difficulty in these processes which have not undergone industrial development.

The horizontal apparatus, in the form of a tunnel, of French Pat. No. 1,288,836, where the material is agitated and advances by virtue of intermittent pulses of steam is also known. The steam/air ratio is high, which has the advantage of allowing a choice of temperature and the steam pressure. However, the heat exchange between the material and the heating elements or walls is only intermittent, limiting the maximum productivity of the apparatus. In addition, the pulsation apparatus is complex and costly.

SUMMARY OF THE INVENTION

We have now found a process for thermal conversion of gypsum to calcium sulfate hemihydrate having improved reactivity and mechanical characteristics for a plaster used in prefabrication which comprises providing a continuous fluidized bed of finely divided gypsum by means of a gas substantially comprising air, maintaining a feed rate of fluidization gas from between the minimum rate below which the bed will remain at rest and about six times this rate, a substantially horizontal movement of the fluidized material from one end of the fluid bed to the other, simultaneous with the progress of the dehydration, heating by means of heating elements immersed in the fluid bed, such that a temperature gradient between the mean temperature of each heating element and said fluidized material is at least about twenty degrees centigrade, removing the water vapor by-product of said dehydrating reaction and recovering at the outlet end of the fluid bed a product substantially being calcium sulfate hemihydrate.

It is an important object of this invention to provide a new and novel process for economically producing calcium sulfate hemihydrate having improved properties useful in plaster prefabrications.

It is a further object of this invention to provide a dehydration reaction for gypsum with efficient control of the kinetics of the reaction along a high coefficient of heat exchange in the fluidized bed.

It is still another object of this invention to provide a process using indirect heating for the dehydration of gypsum which is more efficient in reactant conversion and product yield.

DESCRIPTION OF THE PREFERRED EMBODIMENTS

In accordance with this invention both natural gypsum and synthetic gypsums, such as those originating from the production of phosphoric acid and which are commonly called phosphogypsums, can be used as starting materials in the process and apparatus as herein described. The process comprises a thermal treatment of gypsum, in order to convert it into hemihydrate, by indirect heating in a fluidized bed; the invention provides the following combination: a continuous fluid bed of finely divided gypsum, a feed rate of fluidization gas which is between the minimum theoretical rate below which the bed remains at rest and about six times this speed, a movement of material from one end of the fluid bed to the other, as the dehydration reaction progresses, a supply of heat by means of heating elements immersed in the fluid bed, such that a temperature difference of several tons of degrees is set up between the mean temperature of each heating element and the fluidized material, and the removal of the water vapor produced by the reaction; and at the outlet end of the fluid bed, recovering a product which has been converted almost completely to hemihydrate and which has suitable properties for a plaster used for prefabrication.

In implementing the process, a heated fluid is circulated, generally in separate heating elements, so as to set up, at the inlet of each heating element, a temperature which is practically constant and is between 180° and 300° C. The temperature of the heated fluid is adjusted at the outlet of each heating element, by regulating the flow rate of the heated fluid, so that this outlet temperature is 30° C. to 40° C. below the inlet temperature.

Fluidization conditions are achieved by regulating the feed rate. An average rate for fluidization gas is advantageously selected approaching the formation of fluidization and generally ranging between 5 and 15 cm/sec. At each point in the reactor, the fluidization conditions are such that the temperature and the composition of the mass reacting and of the gases present, are practically homogeneous.

Thus, for a given rate of operation, that is to say for conditions corresponding to a given flow rate of gypsum, a practically constant partial pressure of water vapor, in particular, is maintained at each point of the reactor by controlling the speed of the fluidization gas and the heat conditions. Generally, a partial pressure of water vapor is maintained between 130 and 550 mm. of mercury.

The gypsum undergoing dehydration exhibits a uniform composition at each point of the reactor while the composition changes from one end of the reactor to the other from gypsum dihydrate, $CaSO_4.2H_2O$, to hemihydrate, $CaSO_4. 0.5 H_2O$. The total time the reactant remains in the reactor is generally regulated in such a manner that practically complete conversion to hemihydrate $CaSO_4. 0.5 H_2O$ is obtained at the outlet end.

The gas used for fluidization and which is charged with water vapor is evacuated in the upper part. At the fluidization gas outlet any fine particles of gypsum, which may have been entrained, are collected and returned to the fluid bed.

It has been found advantageous to provide, near the outlet, at least one device for cooling which cools the final heated product. Preferably, the cooling is effected by means of a device which makes it possible to utilize the heat from the heated product in another part of the installation, e.g., the fluidization gases or the primary furnace air of the fluid-heating device.

The process of the invention is carried out by introducing the practically dry gypsum at the inlet of a fluidized bed reactor, which is usually of a horizontal form; the fluidized material is transported by any means known in and of themselves, such as inclining the reactor, passage between baffles or overflow between partitions, all assuring, moreover, better control of the progress of the reaction.

In a particularly advantageous embodiment of the process of the invention, the transport of the material is carried out in a series of communicating compartments which constitute the fluidized bed, each of these compartments possessing a separate heating element and an exhaust method for the removal of the fluidization gases, so that for all intents and purposes the compartment behaves like a homogeneous reactor, the temperature and composition of the reacting material and of the gases present being maintained almost constant in each compartment.

The process of the invention is preferably implemented in an apparatus such as the one represented schematically in the attached drawing. It includes a series of compartments 1, into the first of which the gypsum is introduced at 2 by means of a metering system, not shown but placed at 3 and which could, for example, be a hopper and a dispenser. A fluidization gas is introduced at 4 which enters the reactor by means of diffusing plate 5. The fluidized bed is heated by a system of exchangers 6, in which a fluid circulates, it being possible to constitute this system of exchangers in another method of embodiment by plates or by coils. The fluid is reheated at 7 in an apparatus which can, for example, be an exchanger or a boiler. In the latter case, the fumes from the boiler can be recovered and used to particular advantage as dilution air for a pneumatic drier. Each fluidized compartment possesses a separate exchanger 6 of which the temperature level can be regulated by means of a regulating device which is not shown here. The compartments are separated by partitions 9. In the last two compartments before the outlet, an exchanger 10 has been placed and which may, for example, be a tubular exchanger which permits the plaster to be cooled while reheating the fluidization gas 4 or the primary furnace air by means of pipe 11. The transfer of the material during dehydration, from one compartment to the next, occurs by openings 12, the size and position of which can be adjusted and selected so that the material does not return to the compartment it has just left, and that the heating element is always immersed. The plaster is discharged by means of an overflow 13. A dust elimination device 15 is located at the outlet 14 of the steam-charged fluidization gases. A simple dust filter can be used for this purpose. Only extremely fine particles are entrained with the gases and are recycled through 16 in the reactor. Measurement and control apparatuses have also been installed but these have, for the sake of clarity not been illustrated. The apparatus is preferably constructed to have a very slight horizontal incline, the raised end being that for the intake of material.

The pre-washed, purified (if necessary), and, usually dried, gypsum is introduced in the upper part of the reactor at the same time as the fluidization gas, which is generally air, is introduced in the power part. The size and position of the openings 12 connecting the compartments have been adjusted so as to allow the reacting mass to circulate unidirectionally. The rate of the fluidization gases is regulated so as to achieve a movement of material whereby each compartment behaves like that of a homogeneous reactor.

The dehydration of the gypsum proceeds progressively as the material advances from one compartment to the next. For example, in an experiment carried out in a reactor comprising four calcination compartments, the change in the water content C of the product exiting from each compartment was recorded (the product originates from the manufacture of phosphoric acid and corresponds to that of Example 5 below). In addition, the temperature T of the product in each compartment was recorded.

| Compartments | 1 | 2 | 3 | 4 |
|---|---|---|---|---|
| T. in °C. | 125 | 150 | 168 | 175 |
| C. in % | 15.4 | 11.4 | 8.7 | 5.9 |

Fluidization with a reduced rate is obtained, limiting dispersions to very fine particles, generally in an amount of the order of 5 to 15%. These particles are easily recovered in a purification device of a customary type, and are returned to the reactor. The presence of these fine particles helps in imparting qualities of reactivity to the finished product. The fluidization employed makes it possible to maintain in the reaction medium a relatively high mean water vapor pressure, generally of between 130 and 550 mm. Hg., a water vapor pressure of this order makes it possible to carry out the reaction at a high temperature level, which is also a factor favoring the reactivity of the plaster. Uniform fluidization is obtained which results in a high heat transfer coefficient between the heating element and the reacting mass material. In fact, heat transfer coefficients of the order of 250 to 400 kilocalories/hour/m²/degree Centigrade are observed, this value varying with the rate of fluidization and the degree of fineness of the starting material. This is an excellent heat exchange and makes it possible to reduce the size of the fluidized-bed burner apparatus vis-a-vis the known devices, due to the selection of high temperatures on the walls of the hearing element. The system thus has the advantage of being compact. The system also permits maximum heat recovery. The volume of fluidized air utilized in the process is low. The heat input required to be generated by the boiler or heat exchanger to the system is not a great burden since there is but a small difference in temperature between the entry and exit of the fluid in each heating element.

Furthermore, as a result of the rather high temperature of the heated fluid at the inlet of the exchanger of a particular compartment, an average high temperature difference is achieved between the heat transfer fluid and the reacting mass, which is both favorable to the effect of thermal impart on the grain and also eliminates the need for more than one relatively small exchange surface. In addition, the production capacity of the installation can be made to vary by varying the exchange surface by activating or deactivating one or more exchangers, the exchangers in service working at a high temperature level and fluidization conditions being maintained within similar limits, allowing for constant plaster quality.

The heat balance of the process is improved still further by the possibility of reheating the fluidization air and/or the primary furnace air by cooling the plaster. The fumes from the boiler can also be utilized in another part of the installation. The use of low fluidization rate also makes it unnecessary to employ a gas blower of large capacity.

The process and apparatus of the invention permit advantageous treatment of gypsums of any origin, both natural and synthetic, provided they are fine and dry. Natural gypsum which is crushed and then ground after extraction is generally a powdery product having particles of varying dimensions with fine grains of 10 to 20μ, but also with particles of 200 to 500μ. Conventional heat treatment of natural gypsum encounters difficulties in relation to uniformity of heating and mechanical segregation.

Synthetic gypsums such as those originating from the production of phosphoric acid are commonly called phosphogypsums. The phosphogypsums appear in aqueous suspension, and after drying, in powdery form of rather even grain size, most often ranging between 10 and 100μ, the size of 80 percent of the particles being between 25 and 75μ. The calcination of such a product creates a cleansing and dust elimination problem.

It is obvious that regulating the temperatures of the various heating elements to different values and choosing higher fluidization speeds would make it possible to obtain, when required, products which have been dehydrated beyond the hemihydrate stage.

EXAMPLE 1

A gypsum by-product from the manufacture of phosphoric acid is treated.

After the purification, neutralization, filtration and drying operations, the pulverulent gypsum has the following characteristics:

| | | |
|---|---|---|
| $H_2O$ | | 19.6% |
| Gypsum ($CaSO_4 . 2H_2O$) | | 96% |
| Particle size, cumulative retention | 125μ | <1% |
| | 100μ | 2-4% |
| | 80μ | ~10% |
| | 40μ | ~60% |
| | 25μ | ~80% |
| Apparent density | | 0.85. |

850 kg/hour of this gypsum are introduced into an apparatus such as that shown schematically in FIG. 1, which comprises four calcination compartments. Measurements are taken of the temperatures of the gypsum, the rate of the fluidization gas, the temperature of the heat transfer fluid at the inlet and outlet of the calcination compartments in operation, the temperature of the product obtained at the outlet of the calcination compartments and at the outlet of the cooling compartment, the temperature of the fluidization air and the mean weight ratio of water/air (water resulting from dehydration relative to fluidization air); the proportion of circulating fines is 8%.

These data are all given in Table 1, below, where the temperatures are expressed in degrees Centigrade and where Δt represents the mean temperature difference between the heated fluid and the plaster in the final calcination compartment.

At the outlet of the apparatus, 710 kg/hour of plaster are collected having the following characteristics after grinding:

| | |
|---|---|
| $H_2O$ | 5.6% |
| pH of a 20% strength suspension | 6.3% |
| Gypsum (non-calcined) | 1.2% |
| Hemihydrate | 82-85% |
| Anhydrite III | 14-17% |

Its mechanical properties are measured in accordance with Standard Specification NFB 12,401 and the results are summarized in Table II.

This plaster is excellent for use in prefabrication.

EXAMPLE 2

A natural gypsum which has been crushed and grund is treated and has the following characteristics:

| | | |
|---|---|---|
| Total $H_2O$ | | 23.1% |
| $CaSO_4 2H_2O$ | | 96% |
| Particle size, cumulative retention | 400μ | 0% |
| | 250μ | 7% |
| | 150μ | 14% |
| | 100μ | 26% |
| | 80μ | 34% |
| | 40μ | 62% |
| | 25μ | 85% |

-continued

| | |
|---|---|
| Apparent density | 0.91 |

800 kg/hour of this gypsum are introduced into the same installation as in Example 1 and the same values as those shown in Table I are measured. At the outlet of the apparatus, 670 kg/hour of a product containing the following are collected:

| | |
|---|---|
| Non-calcined gypsum | less than 2% |
| Hemihydrate | 83-86% |
| Anhydrite III | 12-15% |

The mechanical properties of the product are shown in Table II.

This plaster is excellent for use in prefabrication.

EXAMPLE 3

(Comparative)

Calcination of the same starting material as in Example 1 is carried out, but in a rotary furnace with indirect heating, this furnace being provided with a device which permits recycling of the fines into the bed of reacting material during the conversion process analogous to that of the preceding examples.

A conversion yield to plaster of more than 98% is obtained. The mechanical properties of this plaster, measured as in the preceding examples, are given in Table II. It is seen that a conventional method of calcination does not make it possible to obtain the excellent mechanical properties of the phosphogypsums of Example 1.

EXAMPLE 4

(Comparative)

A comparison of mechanical properties of a plaster which is obtained from a natural gypsum similar to that of Example 2, but which has undergone a conventional heat treatment is shown in Table II. It is seen that the product does not have as good reactivity characteristics as those of the product of Example 2 and that the product is less suited for prefabrication.

TABLE II-continued

| NFB 12,401 | Ex. 1 | Ex. 2 | Ex. 3 | Ex. 4 |
|---|---|---|---|---|
| seconds) | | | | |
| End of setting (in minutes and seconds) | 10.30 | 17.30 | 13 | 23 |
| Flexural strength (in bars) | 42 | 32 | 27 | 32 |
| Compressive strength (in bars) | 127 | 87 | 90 | 80 |

It can be seen that the plaster obtained from the phosphogypsum has mechanical properties superior to those of the plaster obtained from natural gypsum and treated according to the process of the invention.

The setting time of the plaster obtained from the phosphogypsum is shorter than that of the natural gypsum and the onset of setting occurs sooner. While these rapid setting characteristics can be attributed to the greater proportion of fine particles in the phosphogypsum, and to the recycling of these fines, the accelerating effect of which is known, these characteristics are also due to the heat shock and to the possibility of regulating the water vapor pressure, both of which are present in the process of the invention. In Comparative Example 3 the process of calcination of the invention renders the phosphogypsum fines more reactive than do the conventional calcination processes.

The comparison of Examples 2 and 4 shows that the process of the invention makes it possible to obtain, from natural gypsum, a product which is more reactive than the product obtained by the known calcination processes.

The process of the invention applies, with all its advantages, to the thermal treatment of phosphogypsums supplying a product which is particularly suitable for prefabrication and with the additional advantage that grinding is not required.

EXAMPLE 5

To show progressive dehydration:

The same starting material as that described in Example 1 is calcined, under the same conditions except for the following:

Temperature of the gypsum at the inlet ... 90° C.

Inlet temperature of the fluid entering the compartments in operation ... 270°-275° C.

TABLE I

| Examples | 1 | 2 |
|---|---|---|
| Treated product | $CaSO_4 \cdot 2HO$, 96% | $CaSO_4 \cdot 2H_2O$, 96% |
| Origin | from phosphoric acid manufacture | natural |
| Apparent density | 0.85 | 0.91 |
| Number of compartments | 4 | 4 |
| Fluidization gas | air | air |
| Rate in cm/sec. | 5.3 | 6.3 |
| Temperature of the gypsum at the inlet (in °C.) | 60 | 18 |
| Inlet temperature of the fluid entering the compartments in operation | 200-285 | 265-270 |
| Outlet temperature of the fluid | 250-255 | 245-250 |
| Temperature of the plaster: | | |
| on leaving the calcination | 180-182 | 172-175 |
| Δt | 86 | 84 |
| on leaving the cooling | 112-115 | 110 |
| Temperature of the fluidization air: | | |
| at the inlet | 109 | 104 |
| at the outlet | 135 | 130 |
| Weight ratio of water/air, in kg/kg | 0.85 | 0.53 |
| Fines recycled, % | 8 | 10 |
| Yield of conversion to hemihydrate | 82-85 | 83-86 |

TABLE II

| NFB 12,401 | Ex. 1 | Ex. 2 | Ex. 3 | Ex. 4 |
|---|---|---|---|---|
| Start of setting (in minutes and | 2.20 | 4.10 | 3.40 | 6 |

Outlet temperature of the fluid ... 235°-240° C.

The temperature of the plaster on leaving the calcination is 172°-175° C.

The temperature of the plaster on leaving the cooling is 108°–110° C.

In each compartment, the average Δt is:

| Compartments | 1 | 2 | 3 | 4 |
|---|---|---|---|---|
| Δt | 130 | 105 | 87 | 80 |

Pursuant to the requirements of the patent statutes, the principle of this invention has been explained and exemplified in a manner so that it can be readily practiced by those skilled in the art, such exemplification including what is considered to be the best embodiment of the invention. However, it should be clearly understood, that within the scope of the appended claims, the invention may be practiced by those skilled in the art and having the benefit of this disclosure, otherwise than as specifically described and exemplified herein.

What is claimed is:

1. Apparatus for the progressive thermal dehydration of gypsum into a calcium sulfate hemihydrate having enhanced mechanical properties and reactivity, said apparatus comprising (i) a dehydration zone including an inlet end, an outlet end, and a plurality of distinct communicating compartments there-between, each compartment defining an individual reactor and each comprising an independent heaing element, (ii) means for feeding fluidization gas into said dehydration zone to thereby establish a homogeneous, continuously fluidized bed of heated, progressively dehydrating finely divided gypsum particles in said dehydration zone, (iii) means for heating said heating elements to thereby indirectly heat said particles to elevated temperatures of dehydration, (iv) means for ensuring that each of said heating elements remains immersed in any fluidized bed thus established, (v) means for establishing a substantially horizontal flow of fluidized gypsum particles progressively and controlledly dehydrating from the inlet end of the fluidized bed to the outlet end thereof, to and through each of the communicating compartments comprising same, without any backflow from compartment to compartment, (vi) means for continuously removing water vapor produced during the dehydration reaction, (vii) means for controlling said fluidization gas feed at a speed ranging from between that minimum theoretical rate at which fluidization is effected to about six times such minimum theoretical rate, said speed being such that an essentially constant partial pressure of water vapor is established and maintained, in conjunction with said heating means, at each point in said fluidized bed, (viii) means for effecting a temperature gradient of at least 20° C. and a heat transfer coefficient ranging from about 250 to 400 kilocalories/hour/m$^2$/° C. between each heating element and the fluidized gypsum particles in each compartment, and (ix) means for the recovery of product substantially comprised of calcium sulfate hemihydrate from the outlet end of the fluidized bed.

2. The apparatus as defined by claim 1, further comprising means for cooling fluidized particles at a point adjacent the outlet end of the dehydration zone.

3. The apparatus as defined in claim 1, further comprising means for separating gypsum particles entrained in outlet fluidization gas and means for recycling same to the dehydration zone.

4. The apparatus as defined by claim 1, wherein the dehydration zone is downwardly inclined with respect to horizontal, from inlet end to outlet end thereof.

5. Apparatus for thermally treating gypsum to dehydrate it into calcium sulfate hemihydrate, comprising:

a reactor having an inlet end and an outlet end;

a plurality of partitions defining a series of compartments within said reactor between the inlet and outlet ends thereof;

means for introducing gypsum into the compartment adjacent the inlet end of said reactor;

means for continuously introducing a fluidization gas into each of said compartments at a rate such that gypsum located therein is continuously fluidized;

a heating element disposed in at least some of said compartments so as to be immersed within the fluidized gypsum in its respective compartment;

an opening disposed in each of said partitions, said openings being dimensioned and located such that a continuous, substantially horizontal movement of homogeneous fluidized gypsum, from the input to the output end of said reactor, is established and the flow of fluidized gypsum between two compartments in the other direction is inhibited; and means for heating said heating elements to temperatures such that the temperature of fluidized gypsum progressively increases in each compartment having a heating element from the input to the output ends of said reactor.

* * * * *